US009141447B2

(12) United States Patent
Sigalov et al.

(10) Patent No.: US 9,141,447 B2
(45) Date of Patent: Sep. 22, 2015

(54) CONDITIONAL DEFERRED QUEUING

(75) Inventors: Fai Sigalov, Redmond, WA (US); Victor Boctor, Redmond, WA (US); Wilbert De Graaf, Bellevue, WA (US); Greg Gourevitch, Redmond, WA (US); Shaun Michael Wallace, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 90 days.

(21) Appl. No.: 12/969,251

(22) Filed: Dec. 15, 2010

(65) Prior Publication Data

US 2012/0159514 A1   Jun. 21, 2012

(51) Int. Cl.
*G06F 9/54* (2006.01)

(52) U.S. Cl.
CPC .................................... *G06F 9/546* (2013.01)

(58) Field of Classification Search
None
See application file for complete search history.

(56) References Cited

U.S. PATENT DOCUMENTS

| | | | | |
|---|---|---|---|---|
| 5,274,823 | A | | 12/1993 | Brenner et al. ............... 710/200 |
| 5,341,491 | A | * | 8/1994 | Ramanujan ................... 711/152 |
| 5,799,002 | A | * | 8/1998 | Krishnan ....................... 370/234 |
| 5,844,980 | A | * | 12/1998 | Patel et al. ................. 379/88.22 |
| 6,055,564 | A | | 4/2000 | Phaal .............................. 709/207 |
| 6,058,389 | A | * | 5/2000 | Chandra et al. ....................... 1/1 |
| 6,076,112 | A | * | 6/2000 | Hauser et al. ................. 709/234 |
| 6,226,641 | B1 | * | 5/2001 | Hickson et al. ....................... 1/1 |
| 6,240,458 | B1 | * | 5/2001 | Gilbertson ..................... 709/232 |
| 6,662,203 | B1 | * | 12/2003 | Kling et al. ..................... 718/103 |
| 6,763,439 | B1 | | 7/2004 | Bakin et al. .................... 711/158 |
| 7,346,000 | B1 | * | 3/2008 | Srinivasan et al. ............ 370/235 |
| 7,580,972 | B2 | * | 8/2009 | Jones et al. .................... 709/203 |
| 8,042,119 | B2 | | 10/2011 | Richards et al. | 
| 2003/0123393 | A1 | * | 7/2003 | Feuerstraeter et al. ....... 370/235 |
| 2003/0135639 | A1 | * | 7/2003 | Marejka et al. ............... 709/232 |
| 2003/0135823 | A1 | * | 7/2003 | Marejka et al. ............... 715/511 |
| 2003/0163544 | A1 | * | 8/2003 | Wookey et al. ............... 709/217 |
| 2004/0151114 | A1 | * | 8/2004 | Ruutu ............................ 370/230 |
| 2005/0100017 | A1 | * | 5/2005 | Williams et al. .............. 370/394 |
| 2005/0149622 | A1 | * | 7/2005 | Kirkland et al. .............. 709/207 |
| 2005/0163048 | A1 | * | 7/2005 | Arora et al. ................... 370/230 |
| 2006/0112166 | A1 | | 5/2006 | Pettigrew et al. ............. 709/206 |
| 2006/0212917 | A1 | * | 9/2006 | Boucher et al. ............... 725/105 |

(Continued)

FOREIGN PATENT DOCUMENTS

CN 1645841 A 7/2005
CN 102541552 A 7/2012

OTHER PUBLICATIONS

Oracle; "Introducing Oracle Streams AQ"; Retrieved Date: Sep. 28, 2010; accessed at http://download.oracle.com/docs/cd/B19306_01/server.102/b14257/aq_intro.htm#CHDIAGFG; 41 pgs.

(Continued)

*Primary Examiner* — Shih-Wei Kraft
(74) *Attorney, Agent, or Firm* — Louise Bowman; Danielle Johnston-Holmes; Micky Minhas (57) ABSTRACT

Conditional deferred queuing may be provided. Upon receiving a message, one or more throttle conditions associated with the message may be identified. A lock associated with the throttle condition may be created on the message until the throttle condition is satisfied. Then, the lock on the message may be removed and the message may be delivered.

19 Claims, 5 Drawing Sheets

(56) References Cited

U.S. PATENT DOCUMENTS

2006/0268692 A1* 11/2006 Wright et al. ............... 370/229
2008/0104283 A1* 5/2008 Shin et al. .................. 710/6
2008/0288946 A1* 11/2008 Richards et al. ............. 718/103
2012/0159514 A1 6/2012 Sigalov et al.

OTHER PUBLICATIONS

Postfix.org; "*Postfix Queue Scheduler*"; Retrieved Date: Sep. 28, 2010; accessed at http://www.postfix.org/SCHEDULER_README.html; 18 pgs.

Park, Brian S.; "*Implementation of New Maisie Runtime System*"; Retrieved Date: Sep. 28, 2010; accessed at http://webcache.googleusercontent.com/search?q=cache:DTxzps7VWxoJ:pcl.cs.ucla.edu/papers/files/theses/bpark-MS.PS+conditional+%22deferred+queue%22+%22priority+queue%22+locked+mail&cd=2&hl=en&ct=clnk&gl=in; 59 pgs.

Pitt.edu; "*Advanced Queuing*"; Retrieved Date: Sep. 28, 2010; accessed at http://www.pittedu/~hoffman/oradoc/server.804/a58241/ch_aq.htm; 73 pgs.

"Third Office Action and Search Report Issued in Chinese Patent Application No. 201110443207.2", Mailed Date: Mar. 23, 2015, 11 Pages.

"First Office Action and Search Report Issued in Chinese Patent Application No. 201110443207.2", Mailed Date: Feb. 8, 2014, 14 Pages.

"Second Office Action Issued in Chinese Patent Application No. 201110443207.2", Mailed Date: Sep. 12, 2014, 11 Pages.

* cited by examiner

CONDITIONAL DEFERRED QUEUING

BACKGROUND

Conditional deferred queuing may provide a capability for delaying message processing according to an established set of rules and/or priorities. In conventional systems, a message may go through a series of queues and processing stages. Each processing block may take a message from the queue, perform an operation on the message, and requeue the message for further processing and/or delivery. In some situations, the processing may need to be delayed, such as when a concurrency limit is exceeded and/or a needed resource is unavailable. With conventional systems, predicting the need to delay processing of the message may be difficult or impossible, so message processing may be delayed for a fixed amount of time. This may lead to idle resources if the fixed delay is too long, or wasted resources if the fixed delay is too short.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Conditional deferred queuing may be provided. Upon receiving a message, one or more throttle conditions associated with the message may be identified. A lock associated with the throttle condition may be created on the message until the throttle condition is satisfied. Then, the lock on the message may be removed and the message may be delivered.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Conditional deferred queuing may be provided. Consistent with embodiments of the present invention, messages may be locked and enqueued according to a throttle condition. A data structure may keep track of the condition that is associated with each locked message in the queue, and a message may not be dequeued while it is locked. A message that is locked on a throttle condition may remain in a locked state until that condition is signaled and it's the first message on that condition. Once a message is unlocked, it may be delivered, to a message processing component or to a recipient, for example, by the next dequeue operation.

The throttle condition may be used as a flag to distinguish one condition from another. The queue may be signaled when a particular condition can accept more messages. For example, for a message identifier condition, the queue may be signaled to unlock the first message on the queue when a copy of the same message currently being processed completes its delivery.

Figure 1:
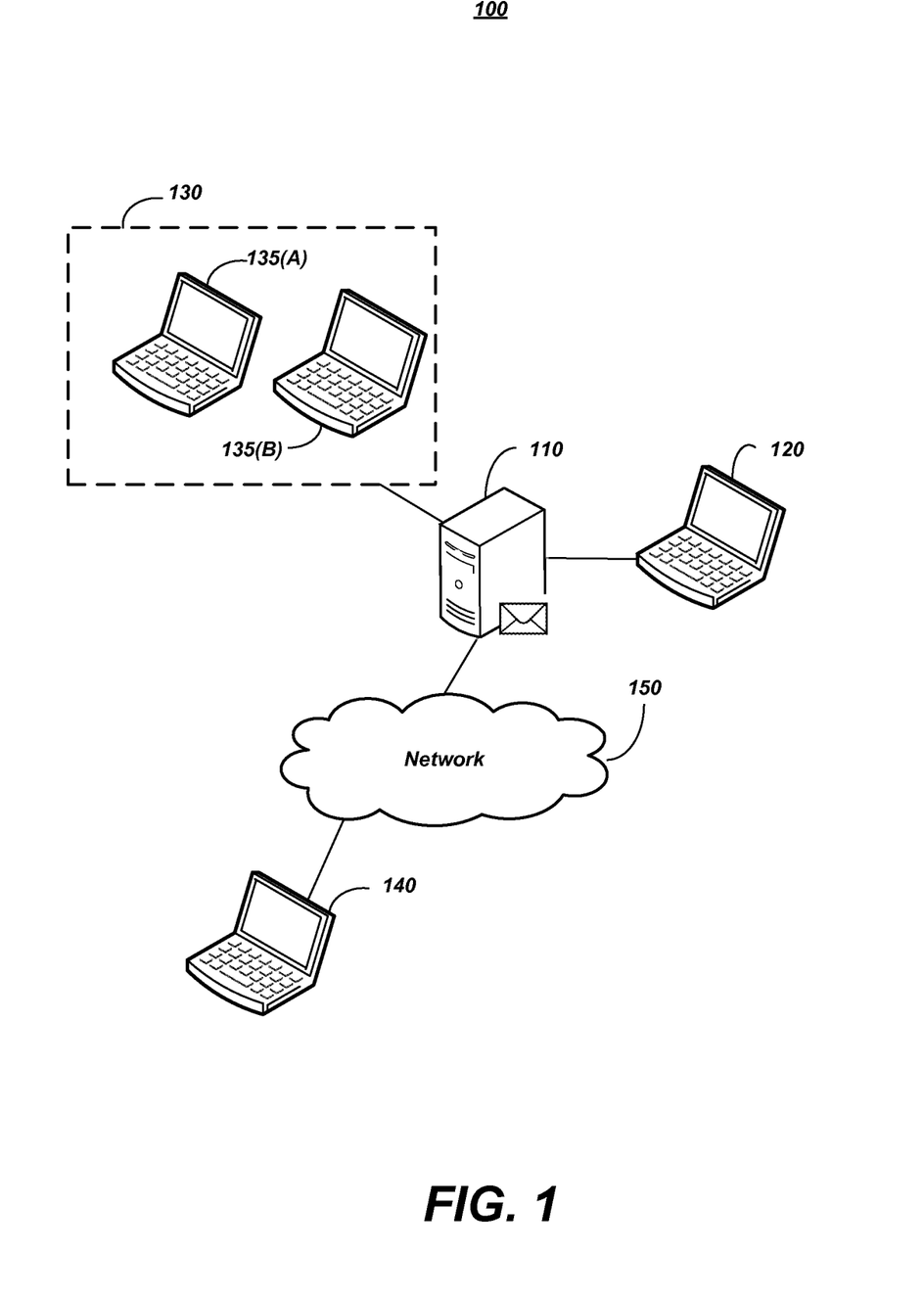
FIG. 1 is a block diagram of an operating environment.

FIG. 1 is a block diagram of an operating environment 100 comprising a mail server 110, a first user 120, a tenant 130 comprising a plurality of users 135(A)-(B), and a second user 140. Tenant 130 may comprise, for example, an individual and/or organizational user whose mail services (e.g., receipt, delivery, and storage of messages) are hosted by mail server 110. Mail server 110, first user 120, tenant 130, and/or second user 140 may be communicatively coupled via a network 150 such as a local area network (LAN) and/or a public network such as the Internet.

Figure 2:
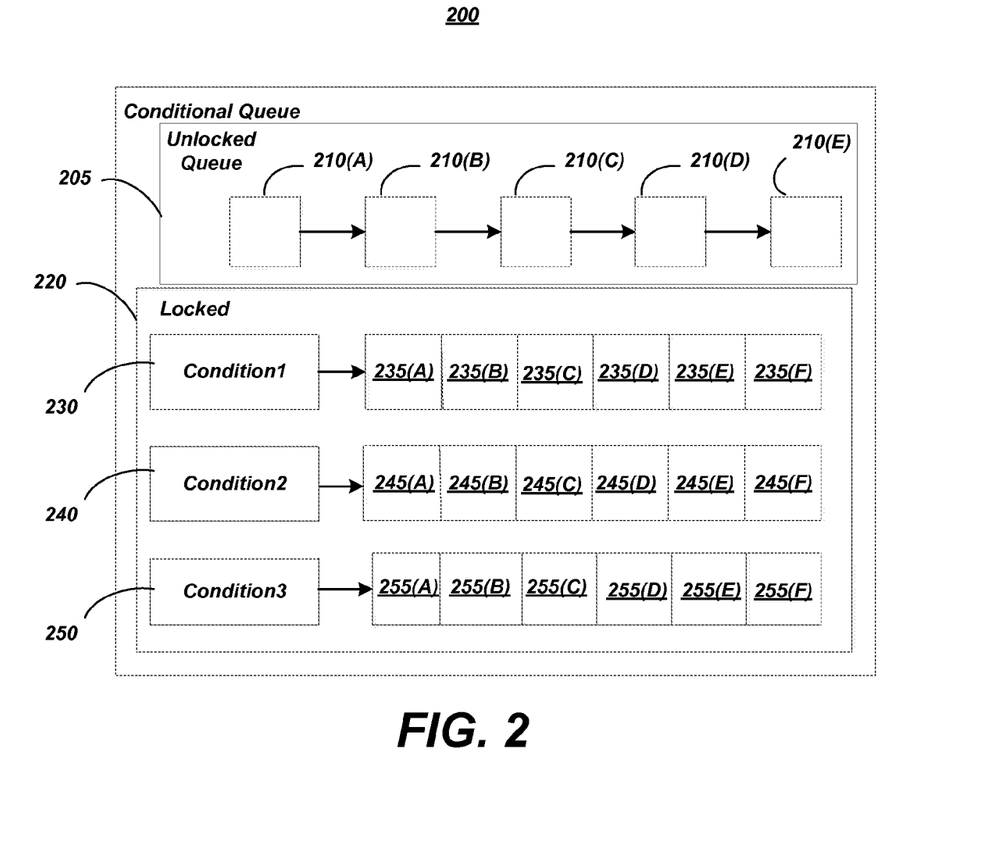
FIG. 2 is a block diagram of a conditional queue.

FIG. 2 is a block diagram of a conditional queue 200. Conditional queue 200 may comprise a plurality of unlocked messages 210(A)-(E) and a locked message list 220. Locked message queue 220 may be associated with a plurality of conditions. For example, locked message queue 220 may comprise a first condition queue 230 comprising a first plurality of locked messages 235(A)-(F), a second condition queue 240 comprising a second plurality of locked messages 245(A)-(F), and a third condition queue 250 comprising a third plurality of locked messages 255(A)-(F).

Each of the condition queues may be associated with a different throttle condition, such as a resource availability condition, a message identifier condition, a concurrency limit condition, and/or a tenancy condition. For example, first condition queue 230 may comprise a concurrency condition queue comprising messages all intended for the same recipient. The concurrency condition queue may, for example, limit the number of messages sent by a single user that may be concurrently processed, allowing messages from other users to receive access to the resources of mail server 110. As each message from that user finishes processing, the next message on the queue may be unlocked and moved to the unlocked message queue. Second condition queue 240 may, for example comprise a resource availability queue of messages waiting to be delivered to a message processing component, such as a virus scanner. Consistent with embodiments of the invention, messages 210(A)-(E), messages 235(A)-(F), messages 245(A)-(F), and/or messages 255(A)-(F) may be queued in order of their receipt by mail server 110.

Figure 3:
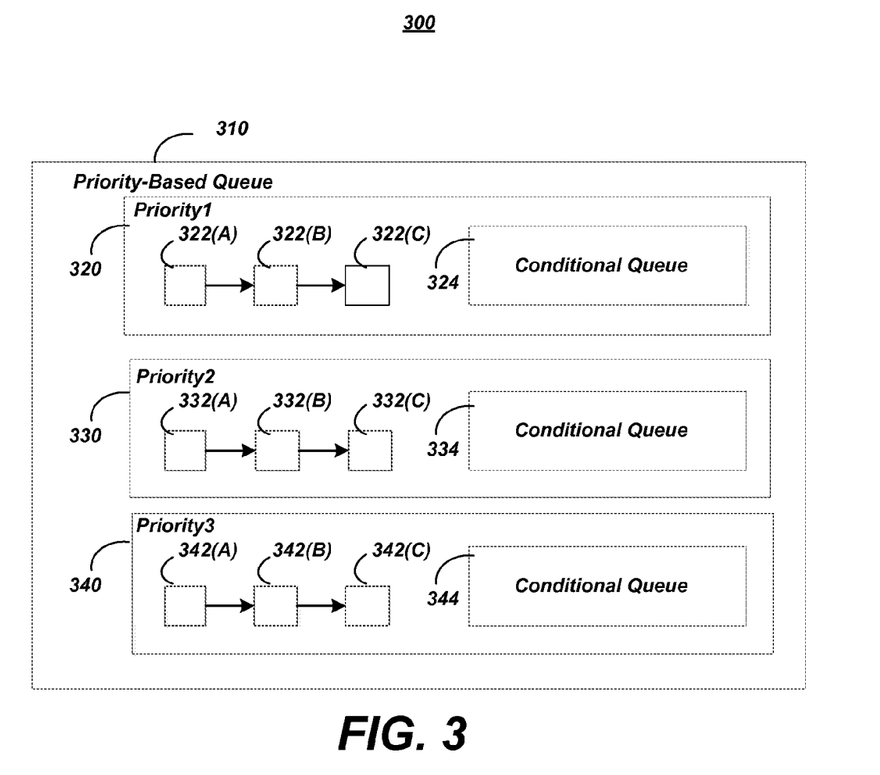
FIG. 3 is a block diagram of a priority based queue.

FIG. 3 is a block diagram of a priority-based queue 300. Priority-based queue 300 may comprise a first priority queue 320 comprising a plurality of first priority active messages 322(A)-(C) and a first conditional queue 324, a second priority queue 330 comprising a plurality of second priority active messages 332(A)-(C) and a second conditional queue 334, and a third priority queue 340 comprising a plurality of third priority active messages 342(A)-(C) and a third conditional queue 344. Active messages may comprise messages that have never been locked in a respective conditional queue; active and unlocked messages may be currently deliverable while locked messages may not be currently deliverable.

A dequeue request may be generated by mail server 110 that may comprise a specific priority causing the first active and/or unlocked item enqueued at that priority to be delivered. Dequeuing requests without a priority may cause the first active and/or unlocked message to be delivered and/or may rely on a specific heuristic about which priority to dequeue next based on prior dequeues and enqueues. For example, the priority queue with the largest backlog or the queue with the least recent dequeue may be dequeued. Dequeue operations at a given priority may dequeue an unlocked message from the associated conditional queue first, and if no message is found, then dequeue from the queue of active messages at that priority. An unlocked message may be prioritized ahead of messages that were never locked within the same priority (i.e., active messages) but behind messages that were unlocked ahead of that message. A locked message may be prioritized behind all other messages as it is not eligible to be dequeued. Unlock requests may be similarly generated by mail server 110 when the condition associated with the respective condition queue occurs. For example, locked messages in first conditional queue 324 may each be associated with the same recipient. When one message for that recipient is delivered, an unlock request may be generated causing the next locked message for that recipient to be unlocked and made available for a future dequeue request.

Figure 4:
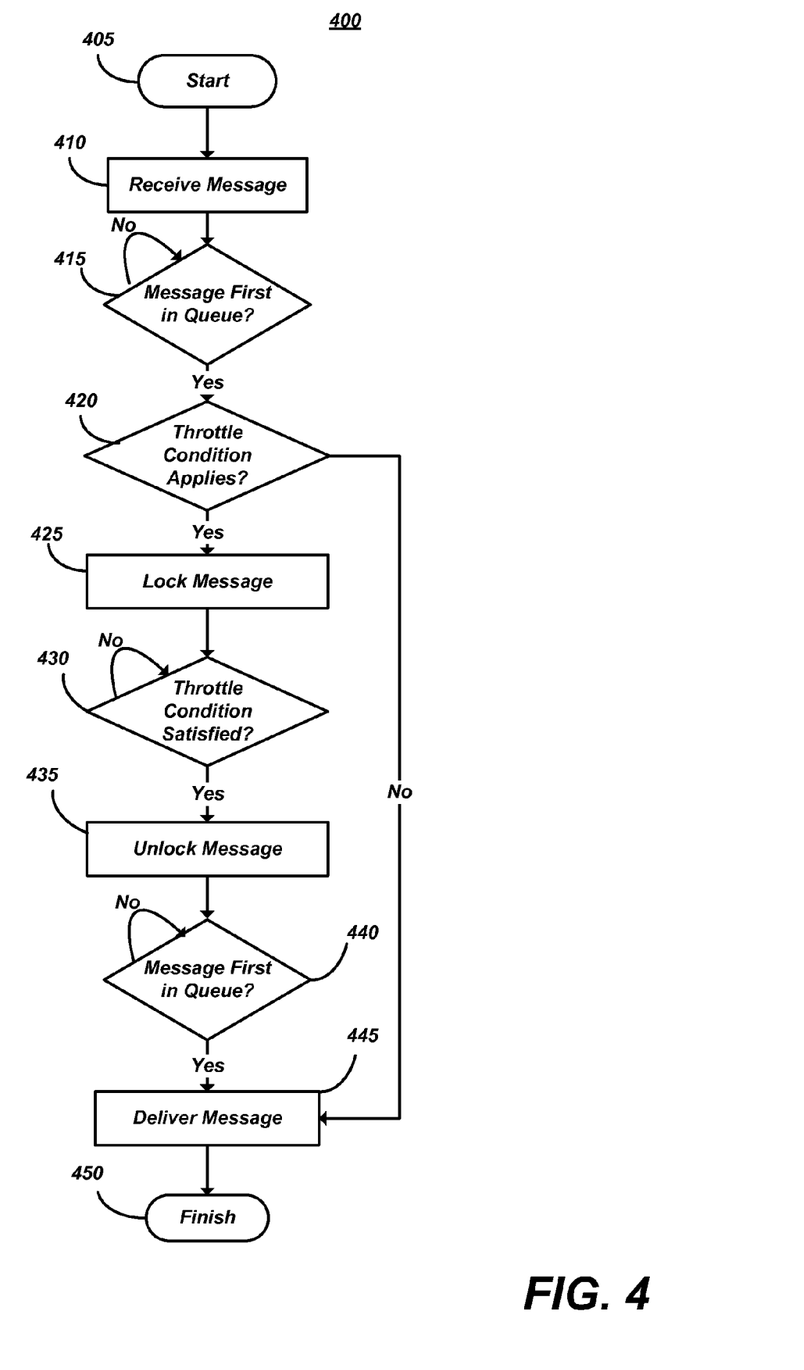
FIG. 4 is a flow chart of a method for providing conditional deferred queuing.
Figure 5:
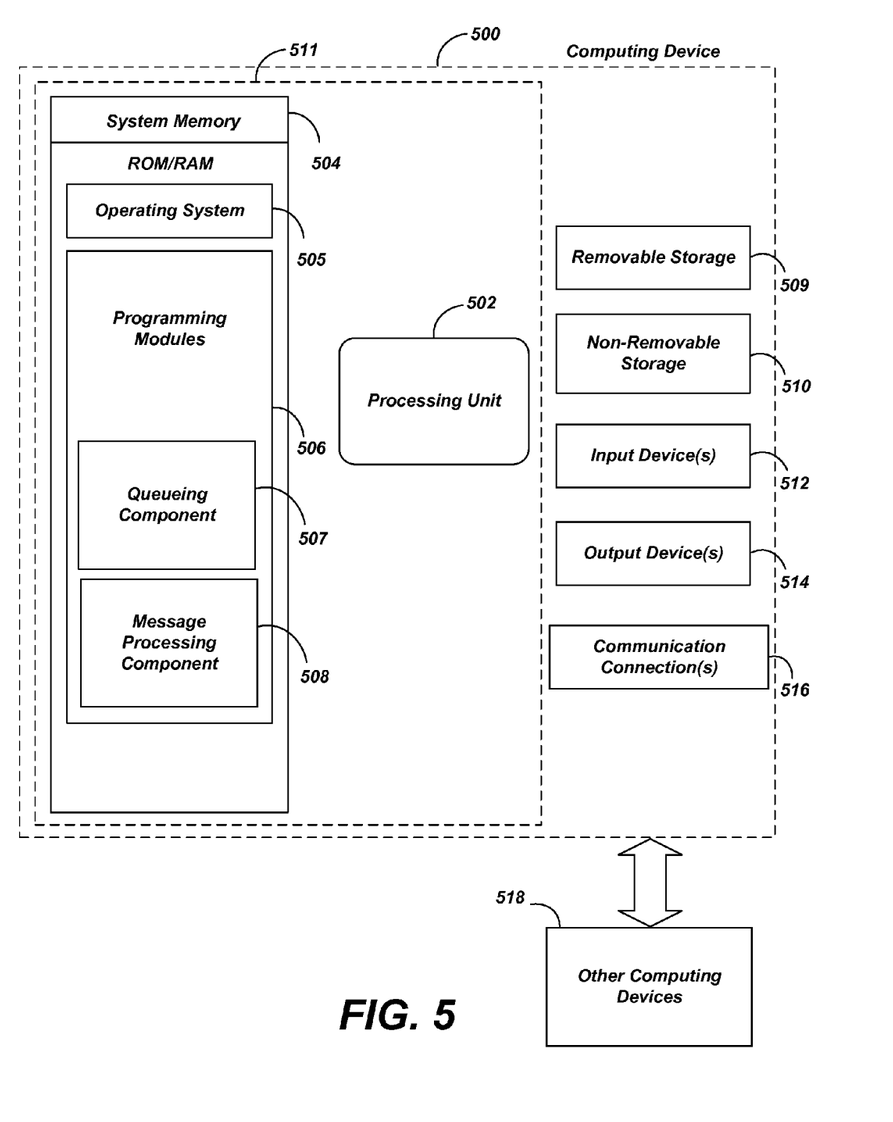
FIG. 5 is a block diagram of a system including a computing device.

FIG. 4 is a flow chart setting forth the general stages involved in a method 400 consistent with an embodiment of the invention for providing conditional deferred queueing. Method 400 may be implemented using a computing device 500 as described in more detail below with respect to FIG. 4. Ways to implement the stages of method 400 will be described in greater detail below. Method 400 may begin at starting block 405 and advance to stage 410 where computing device 500 may receive a message. For example, mail server 110 may receive a message from first user 120 for delivery to plurality of users 135(A)-(B) associated with tenant 130. Consistent with embodiments of the invention, the message may be enqueued on an active message queue upon receipt.

From stage 410, method 400 may advance to stage 415 where computing device 500 may determine whether the message is first in the active message queue. If not, method 400 may remain in stage 415 (e.g., other messages in the active queue ahead of the message may be processed) until the message becomes first in the queue.

Once the message reaches the front of the active message queue, method 400 may then advance to stage 420 where computing device 500 may determine whether a throttle condition applies to the message. For example, a service level agreement with second user 140 may prioritize messages sent and/or received by second user 140. If messages received from second user 140 are currently being processed by message processing components such as a DNS resolver, a spam filter, and/or a virus scanner, the message received from first user 120 may be associated with a resource availability throttle condition. Mail server 110 may make this determination as each message is dequeued from the active message queue, which may occur in the order the messages were received by mail server 110.

If the message is determined to be associated with a throttle condition at stage 420, method 400 may advance to stage 425 where computing device 500 may lock the message. For example, mail server 110 may associate a "locked" flag with the message and assign the message to third condition queue 250. Such a locked message may not be delivered until the throttle condition is satisfied and the locked flag associated with the message is cleared. Consistent with embodiments of the invention, locked messages may be maintained in order and may be entered into locked message queue 220.

From stage 425, method 400 may advance to stage 430 where computing device 500 may determine whether the throttle condition is satisfied. If not, method 400 may remain in stage 430 until the throttle condition has been met. For example, if the message is waiting on a virus scanner component to become available, the message may remain locked in the resource availability condition queue until the virus scanner indicates that it has become available. The indication may comprise, for example, an Application Programming Interface (API) invocation and/or a Remote Procedure Call (RPC) to unlock a message After the throttle condition is determined to be satisfied at stage 430, method 400 may advance to stage 435 where computing device 500 may unlock the message. For example, mail server 110 may clear the "locked" flag associated with the message and re-assign the message from locked message queue 220 to unlocked queue 205 of conditional queue 200. Consistent with embodiments of the invention, multiple messages may be unlocked in a single operation. For example, upon determining that a throttle condition associated with delivering messages to a particular recipient is satisfied, a plurality of messages destined for that recipient may be unlocked.

From stage 435, method 400 may advance to stage 440 where computing device 500 may determine whether the message is first in the queue. For example, messages may be queued according to a first-in-first-out (FIFO) manner, with unlocked messages being assigned according to the time they were unlocked and messages not associated with a throttle condition being assigned according to the time they were received. Consistent with embodiments of the invention, messages received from a conditional queue may be assigned according to the time they were received and may thus be in the queue ahead of messages that were not associated with a throttle condition but which were received after the throttled message. Consistent with further embodiments of the invention, messages that become unlocked may be dequeued ahead of messages that were never locked. Method 400 may remain in stage 440 until the message is the first message in queue 205 when a dequeue request is received.

If the message is first in the queue, or if no throttle condition was determined to apply at stage 420, method 400 may then advance to stage 445 where computing device 500 may deliver the message. For example, mail server 110 may deliver the message to a recipient, such as user 135(A) associated with tenant 130. For another example, mail server 110 may deliver the message to a processing component such as a virus scanner. Consistent with embodiments of the invention, the message may be requeued after processing by a component. Method 400 may then end at stage 450.

An embodiment consistent with the invention may comprise a system for providing conditional deferred queuing. The system may comprise a memory storage and a processing unit coupled to the memory storage. The processing unit may be operative to receive a message, identify a throttle condition associated with the message, create a lock on the message associated with the throttle condition, and determine whether the throttle condition is satisfied. In response to determining that the throttle condition is satisfied, the processing unit may be operative to remove the lock on the message and then deliver the message. The message may comprise, for example, an e-mail message, an instant messaging service message, and/or a text message. The throttle condition may comprise, for example, a resource availability condition, a message identifier condition, a concurrency limit condition, and/or a tenancy condition. Being operative to deliver the message may comprise the processing unit being operative to deliver the message to a recipient user and/or a message processing component (e.g., a virus scanner, a spam filter, an ad service, a calendaring function, etc.).

The processing unit may be further operative to, prior to removing the lock on the message, determine whether the message is a first locked message of the conditional queue. If not, the processing unit may maintain the lock on the message. The processing unit may be further operative to identify a priority associated with the message and assign the message to a priority queue associated with the identified priority. The conditional queue may be associated with the priority queue; that is, a plurality of conditional queues may be used and each may be associated with one and/or more priority queues.

Consistent with embodiments of the invention, messages in the priority queue(s) may not be associated with throttle conditions. The processing unit may be operative to receive an unlock request associated with the identified priority, determine whether the message is first in the queue associated with the throttle condition, and in response to determining that the message is first, unlock the message and move it to an unlocked/active queue. In response to receiving a dequeue request, the first message of the unlocked/active queue may be delivered.

Another embodiment consistent with the invention may comprise a system for providing conditional deferred queuing. The system may comprise a memory storage and a processing unit coupled to the memory storage. The processing unit may be operative to receive a message, identify a throttle condition associated with the message, assign the message to a conditional queue associated with the throttle condition, determine whether the throttle condition is satisfied, and, if so, deliver the message if the message is the first message in the conditional queue. The throttle condition may comprise, for example, a concurrency limit condition associated with a recipient and/or a sender of the message. That is, the throttle condition may limit the number of messages that may be concurrently processed that are addressed to and/or sent by a single user. The throttle condition may comprise a message identifier condition limiting processing of a plurality of copies of the message, such as where the same message is being sent and/or copied to multiple recipients. The throttle condition may comprise a resource availability condition comprising a threshold number of simultaneous messages that can be handled by a message processing component (e.g. a memory and or processing capability limit). The throttle condition comprises a tenancy condition associated with queuing a plurality of messages associated with a plurality of message processing tenants. For example, multiple organizations may use the resources of a single mail server as tenants; throttle conditions may limit the number of messages being processed for each of those tenants at any given time.

Yet another embodiment consistent with the invention may comprise a system for providing conditional deferred queuing. The system may comprise a memory storage and a processing unit coupled to the memory storage. The processing unit may be operative to receive a message, determine whether the message is associated with at least one of a plurality of throttle conditions, and, in response to determining that the message is associated with the at least one of the plurality of throttle conditions, lock the message. In response to determining that the throttle condition has been satisfied, the processing unit may be operative to unlock the message. If the message is not associated with a throttle condition, the processing unit may be operative to deliver the message.

FIG. 5 is a block diagram of a system including computing device 500. Consistent with an embodiment of the invention, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the invention. Furthermore, computing device 500 may comprise an operating environment for system 100 as described above. System 100 may operate in other environments and is not limited to computing device 500.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include, for example, a queuing component 507 and/or a message processing component 508. Operating system 505, for example, may be suitable for controlling computing device 500's operation. Furthermore, embodiments of the invention may be practiced in conjunction with a graphics library, other operating systems, or any other application program and is not limited to any particular application or system. This basic configuration is illustrated in FIG. 5 by those components within a dashed line 511.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 may perform processes including, for example, one or more of method 400's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method, implemented by a computing device, for providing conditional deferred queuing, the method comprising:

receiving, by a processor of the computing device, a message;

identifying, by the processor, a priority associated with the message;

assigning, by the processor, the message to a priority queue associated with the identified priority;

enqueuing, by the processor, the message on an active message queue associated with the priority queue;

identifying, by the processor, a throttle condition associated with the message at the computing device, the throttle condition including a concurrency limit condition that sets a limit on a number of messages that are concurrently processed for an individual user;

in response to identifying the throttle condition, creating, by the processor, a lock on the message associated with the throttle condition and assigning the message to a locked message queue of a conditional queue associated with the priority queue;

when the throttle condition is not satisfied, maintaining, by the processor, the message in the locked message queue and maintaining the lock on the message;

in response to determining that the throttle condition is satisfied, removing, by the processor, the lock on the message and moving the message to an unlocked queue associated with the conditional queue;

determining, by the processor, whether a dequeue request associated with the priority queue has been received;

in response to determining that the dequeue request has been received, determining, by the processor, whether the message is a first message in the unlocked queue associated with the priority queue; and in response to determining that the message is the first message in the unlocked queue, delivering, by the processor, the message.

2. The method of claim 1, wherein the message comprises at least one of the following: an e-mail message, an instant messaging service message, and a text message.

3. The method of claim 1, wherein identifying the throttle condition comprises identifying at least one of the following: a resource availability condition, a message identifier condition, and a tenancy condition.

4. The method of claim 1, wherein the priority queue further comprises a plurality of messages not associated with the throttle condition.

5. The method of claim 4, further comprising:

receiving a delivery request associated with the identified priority;

determining whether the lock is maintained on the message; and in response to determining that the lock is maintained on the message associated with the throttle condition, delivering at least one of the plurality of messages not associated with the throttle condition.

6. The method of claim 1, wherein delivering the message comprises delivering the message to at least one recipient user.

7. The method of claim 1, wherein delivering the message comprises delivering the message to a message processing component.

8. A computer-readable storage device, not including a signal, which stores a set of instructions which when executed performs a method for providing conditional deferred queuing, the method executed by the set of instructions comprising:

receiving, by a processor, a message;

identifying, by the processor, a priority associated with the message;

assigning, by the processor, the message to a priority queue associated with the identified priority;

enqueuing, by the processor, the message on an active message queue associated with the priority queue;

identifying, by the processor, a throttle condition associated with the message including a concurrency limit condition that sets a limit on a number of messages that are concurrently processed for an individual user;

in response to identifying the throttle condition, creating, by the processor, a lock on the message associated with the throttle condition and assigning the message to a locked message queue of a conditional queue associated with the priority queue;

when the throttle condition is not satisfied, maintaining, by the processor, the message in the locked message queue and maintaining the lock on the message;

determining whether the throttle condition is satisfied;

in response to determining that the throttle condition is satisfied, removing, by the processor, the lock on the message and moving the message to an unlocked queue associated with the conditional queue;

determining, by the processor, whether a dequeue request associated with the priority queue has been received;

in response to determining that the dequeue request has been received, determining, by the processor, whether the message is a first message in the unlocked queue associated with the priority queue; and in response to determining that the message is the first message in the unlocked queue, delivering, by the processor, the message.

9. The computer-readable storage device of claim 8, wherein the throttle condition includes a concurrency limit condition associated with at least one of the following: a recipient of the message and a sender of the message.

10. The computer-readable storage device of claim 8, wherein the throttle condition comprises a message identifier condition limiting processing of a plurality of copies of the message.

11. The computer-readable storage device of claim 8, wherein the throttle condition comprises a resource availability condition.

12. The computer-readable storage device of claim 11 wherein the resource availability condition comprises a threshold number of simultaneous messages that can be handled by a message processing component.

13. The computer-readable storage device of claim 8, wherein the throttle condition comprises a tenancy condition associated with queuing a plurality of messages associated with a plurality of message processing tenants.

14. A system for providing a context-aware environment, the system comprising:

a memory storage; and a processing unit coupled to the memory storage, wherein the processing unit is operative to:

receive, by the processing unit, a message;

identify, by the processing unit, a priority associated with the message;

assign, by the processing unit, the message to a priority queue associated with the identified priority;

enqueue, by the processor, the message on an active message queue associated with the priority queue;

identify, by the processing unit, a throttle condition associated with the message including a concurrency limit condition that sets a limit on a number of messages that are concurrently processed for an individual user;

in response to identifying the throttle condition, creating, by the processor, a lock on the message associated with the throttle condition and assigning the message to a locked message queue of a conditional queue associated with the priority queue;

when the throttle condition is not satisfied, maintaining, by the processing unit, the message in the locked message queue and maintaining the lock on the message;

in response to determining that the throttle condition is satisfied, removing, by the processing unit, the lock on the message and moving the message to an unlocked queue associated with the conditional queue;

determine, by the processing unit, whether a dequeue request associated with the priority queue has been received;

in response to determining that the dequeue request has been received, determine, by the processing unit, whether the message is a first message in the unlocked queue associated with the priority queue; and in response to determining that the message is the first message in the unlocked queue, deliver, by the processing unit, the message.

15. The system of claim 14, wherein identifying the throttle condition comprises identifying at least one of the following: a resource availability condition, a message identifier condition, and a tenancy condition.

16. The system of claim 14, wherein the priority queue further comprises a plurality of messages not associated with the throttle condition.

17. The system of claim 16, further comprising:
receiving a delivery request associated with the identified priority;
determining whether the lock is maintained on the message; and
in response to determining that the lock is maintained on the message associated with the throttle condition, delivering at least one of the plurality of messages not associated with the throttle condition.

18. The system of claim 14, wherein delivering the message comprises delivering the message to at least one recipient user.

19. The system of claim 14, wherein delivering the message comprises delivering the message to a message processing component.

* * * * *